United States Patent
Wu et al.

(10) Patent No.: US 6,473,735 B1
(45) Date of Patent: Oct. 29, 2002

(54) SYSTEM AND METHOD FOR SPEECH VERIFICATION USING A CONFIDENCE MEASURE

(75) Inventors: Duanpei Wu, San Jose; Xavier Menendez-Pidal, Los Gatos; Lex Olorenshaw, Corte Madera; Ruxin Chen, San Jose, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/553,985

(22) Filed: Apr. 20, 2000

Related U.S. Application Data

(60) Provisional application No. 60/160,859, filed on Oct. 21, 1999.

(51) Int. Cl.$^7$ ............................................. G10L 15/06
(52) U.S. Cl. ........................................ 704/240; 704/255
(58) Field of Search ............................ 371/88; 704/240, 704/231, 246, 256, 255

(56) References Cited

U.S. PATENT DOCUMENTS

| | | | |
|---|---|---|---|
| 5,274,695 A | * 12/1993 | Green | 379/88 |
| 5,430,827 A | * 7/1995 | Rissanen | 704/273 |
| 5,675,704 A | * 10/1997 | Juang et al. | 704/246 |
| 5,737,489 A | * 4/1998 | Chou et al. | 704/256 |
| 5,819,222 A | * 10/1998 | Smyth et al. | 704/256 |

* cited by examiner

*Primary Examiner*—Susan McFadden
(74) *Attorney, Agent, or Firm*—Gregory J. Koerner; Simon & Koerner LLP

(57) ABSTRACT

The present invention comprises a system and method for speech verification using a confidence measure that includes a speech verifier which compares a differential score for a recognized word to a predetermined threshold value, where a recognized word is the word model that produced the highest recognition score. In one embodiment, a single threshold is used for each word in a vocabulary. In another embodiment, each word model has an associated threshold, so that a differential score for a recognized word is compared to a unique threshold associated with that word. In a further embodiment, pairs of confused words in the vocabulary are dealt with separately. If a confused word is the recognized word, the speech verifier compares the differential score to a threshold that depends on the word model that produced the next-highest recognition score. Different values for the various thresholds may maximize rejection accuracy or recognition accuracy. A trade-off between rejection accuracy and recognition accuracy may be made by utilizing an intermediate threshold value that is between a minimum threshold value and a maximum threshold value.

37 Claims, 7 Drawing Sheets

SYSTEM AND METHOD FOR SPEECH VERIFICATION USING A CONFIDENCE MEASURE

CROSS-REFERENCE TO RELATED APPLICATION

This application is related to, and claims the benefit of, U.S. Provisional Application No. 60/160,859, entitled "System And Method For Speech Verification Using A Confidence Measure," filed Oct. 21, 1999, which is hereby incorporated by reference.

BACKGROUND SECTION

1. Field of the Invention

This invention relates generally to electronic speech recognition systems, and relates more particularly to a system and method for speech verification using a confidence measure.

2. Description of the Background Art

Implementing an effective and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

Speech-activated electronic systems may be used in a variety of noisy environments such as industrial facilities, manufacturing facilities, commercial vehicles, passenger vehicles, homes, and office environments. A significant amount of noise in an environment may interfere with and degrade the performance and effectiveness of speech-activated systems. System designers and manufacturers typically seek to develop speech-activated systems that provide reliable performance in noisy environments.

In a noisy environment, sound energy detected by a speech-activated system may contain speech and a significant amount of noise. In such an environment, the speech may be masked by the noise and be undetected. This result is unacceptable for reliable performance of the speech-activated system.

Alternatively, sound energy detected by the speech-activated system may contain only noise. The noise may be of such a character that the speech-activated system identifies the noise as speech. This result reduces the effectiveness of the speech-activated system, and is also unacceptable for reliable performance. Verifying that a detected signal is actually speech increases the effectiveness and reliability of speech-activated systems.

A speech-activated system may have a limited vocabulary of words that the system is programmed to recognize. The system should respond to words or phrases that are in its vocabulary, and should not respond to words or phrases that are not in its vocabulary. Verifying that a recognized word is in the system's vocabulary increases the accuracy and reliability of speech-activated systems.

Therefore, for all the foregoing reasons, implementing an effective and efficient method for a system user to interface with electronic devices remains a significant consideration of system designers and manufacturers.

SUMMARY

In accordance with the present invention, a system and method are disclosed for speech verification using a confidence measure. In one embodiment, the invention includes a speech verifier that compares a differential score for a recognized word to a predetermined threshold value, where a recognized word is the word model that produced the highest recognition score. The speech verifier preferably includes a word model for each word in a vocabulary of the system.

In one embodiment, a single threshold is used for each word in the vocabulary. In another embodiment, each word model has an associated threshold, so that a differential score for a recognized word is compared to a unique threshold associated with that word. To determine a threshold value, a set of test utterances may be compared with each model. A differential score for each utterance and each model may then be calculated. A minimum differential score for each model is determined, and the minimum differential score is utilized a the threshold value for each word. In the foregoing single threshold embodiment, the single threshold may preferably correspond to a minimum of the minimum differential scores. In a further embodiment, pairs of confused words in the vocabulary may be dealt with separately. Confused words are two phonetically-similar words. A speech recognition system may often identify a confused word as the other word in the pair. If a confused word is the recognized word, then the speech verifier may compare the differential score to a threshold that depends on the word model that produced the next-highest recognition score.

Different values for the various thresholds may maximize rejection accuracy or recognition accuracy. A trade-off between rejection accuracy and recognition accuracy may be made by utilizing an intermediate threshold value between a minimum threshold value and a maximum threshold value. A maximum threshold value may be determined by comparing a set of out-of-vocabulary test utterances with each word model, which generates a differential score for each out-of-vocabulary test utterance. A maximum differential score may be determined for each vocabulary word, which then may be utilized as a maximum threshold value.

The present invention thus efficiently and effectively implements speech verification using a confidence measure.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for speech verification using a confidence measure that includes a speech verifier which compares a differential score for a recognized word to a predetermined threshold value, where a recognized word is the word model that produced the highest recognition score. In one embodiment, a single threshold is used for each word in a vocabulary. In another embodiment, each word model has an associated threshold, so that a differential score for a recognized word is compared to a unique threshold associated with that word. In a further embodiment, pairs of confused words in the vocabulary are dealt with separately. If a confused word is the recognized word, the speech verifier compares the differential score to a threshold that depends on the word model that produced the next-highest recognition score. Different values for the various thresholds may maximize rejection accuracy or recognition accuracy. A trade-off between rejection accuracy and recognition accuracy may be made by utilizing an intermediate threshold value that is between a minimum threshold value and a maximum threshold value.

Figure 1:
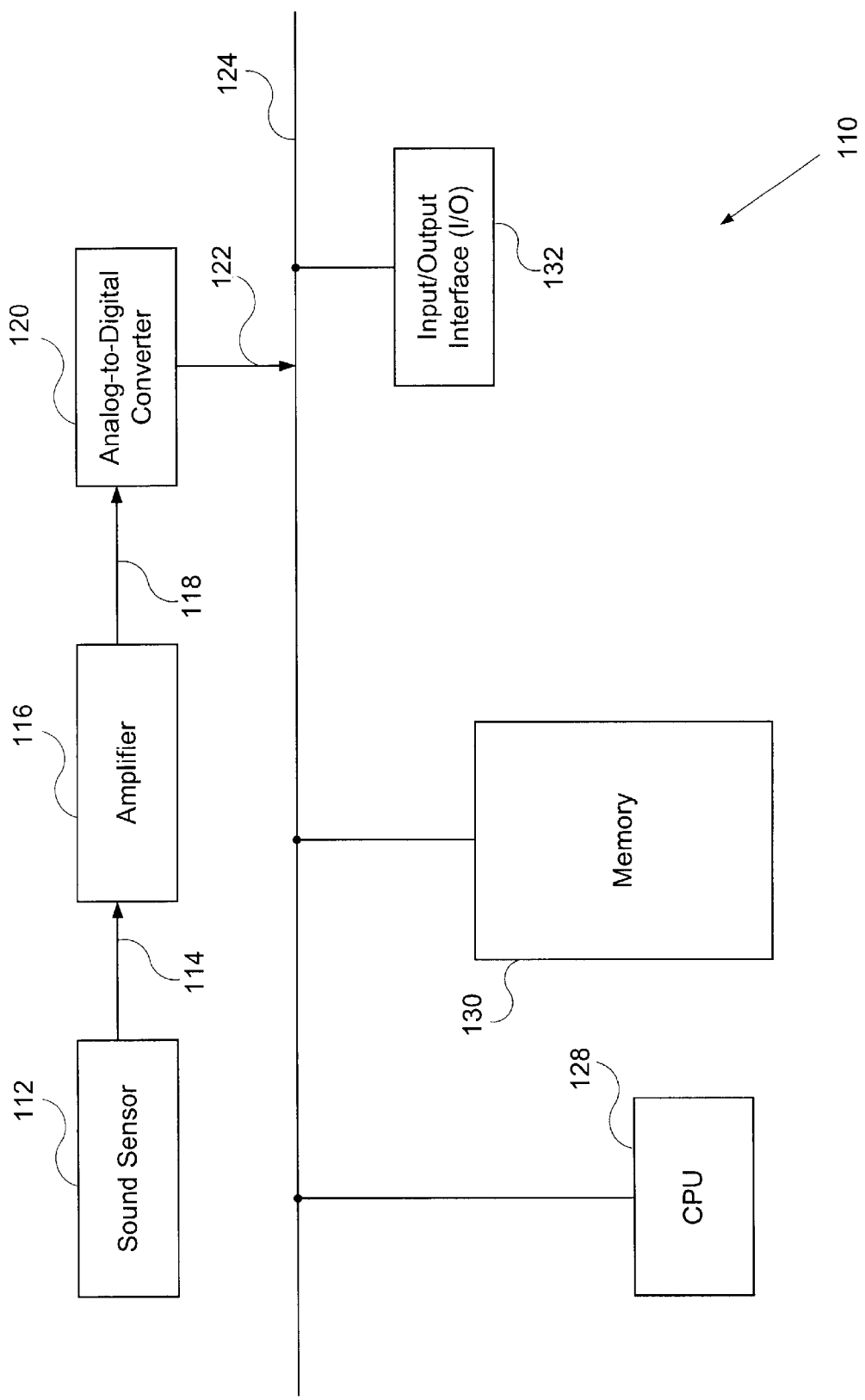
FIG. 1 is a block diagram for one embodiment of a computer system, according to the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2–7. After the speech data is processed, CPU 128 may then provide the results of the speech detection analysis to other devices (not shown) via input/output interface 132.

Figure 2:
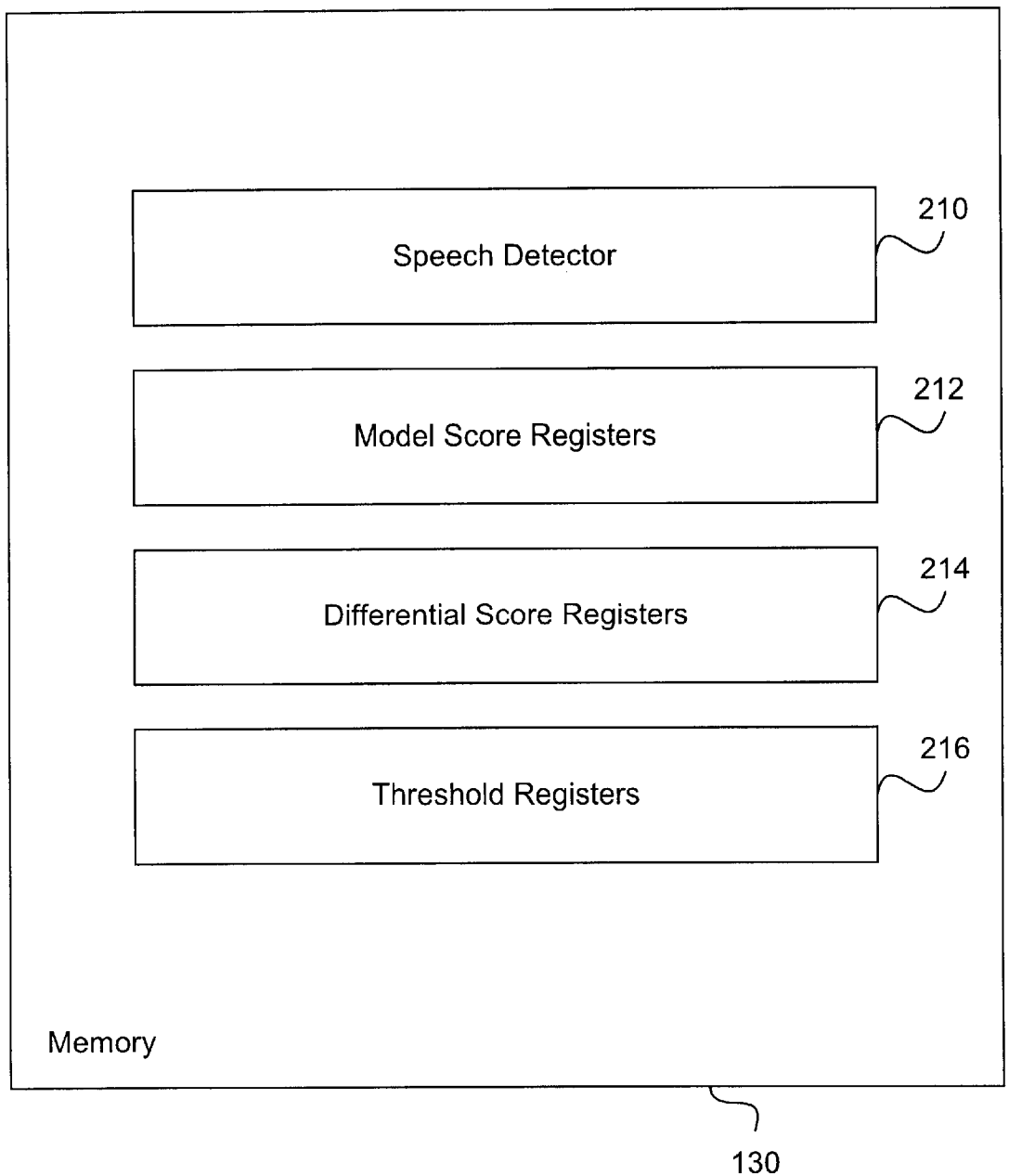
FIG. 2 is a block diagram for one embodiment of the memory of FIG. 1, according to the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech detector 210, model score registers 212, differential score registers 214, and threshold registers 216.

In the FIG. 2 embodiment, speech detector 210 includes a series of software modules that are executed by CPU 128 to analyze and detect speech data, and which are further described below in conjunction with FIGS. 3–4. In alternate embodiments, speech detector 210 may readily be implemented using various other software and/or hardware configurations.

Model score registers 212, differential score registers 214, and threshold registers 216 contain respective variable values that are calculated and utilized by speech detector 210 to implement the speech verification method of the present invention. The utilization and functionality of model score registers 212, differential score registers 214, and threshold registers 216 are further discussed below in conjunction with FIGS. 3–4.

Figure 3:
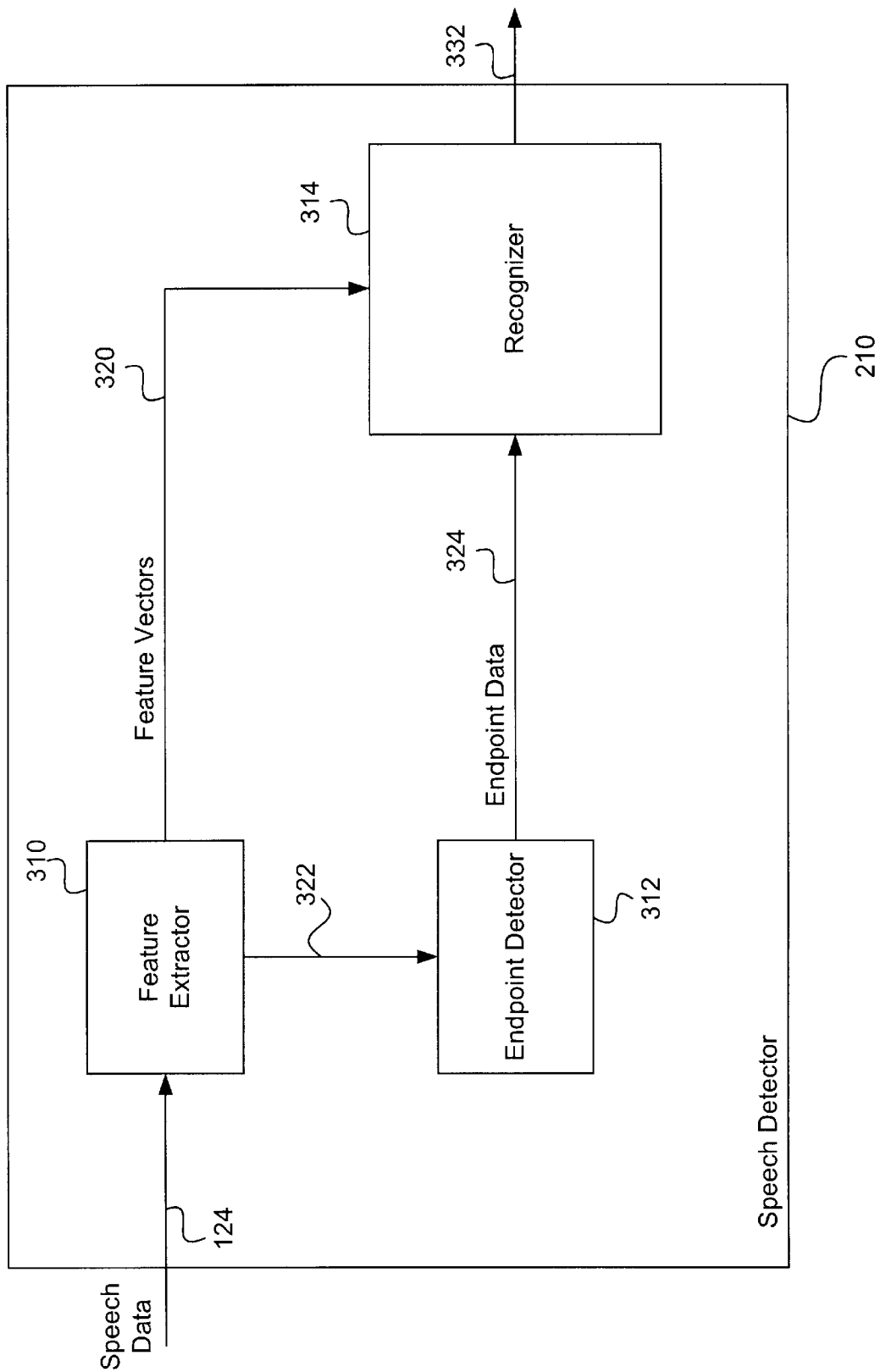
FIG. 3 is a block diagram for one embodiment of the speech detector of FIG. 2, according to the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314.

Analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize isolated words in a predetermined vocabulary of system 110. In the FIG. 3 embodiment, recognizer 314 is configured to recognize a vocabulary of one hundred twenty five words; however, a vocabulary including any number of words is within the scope of the present invention. The vocabulary words may correspond to commands or instructions for system 110. Thus, verifying that a recognized word is a valid vocabulary word is significant for proper operation of system 110. Valid recognized vocabulary words are output to system 110 via path 332.

Figure 4:
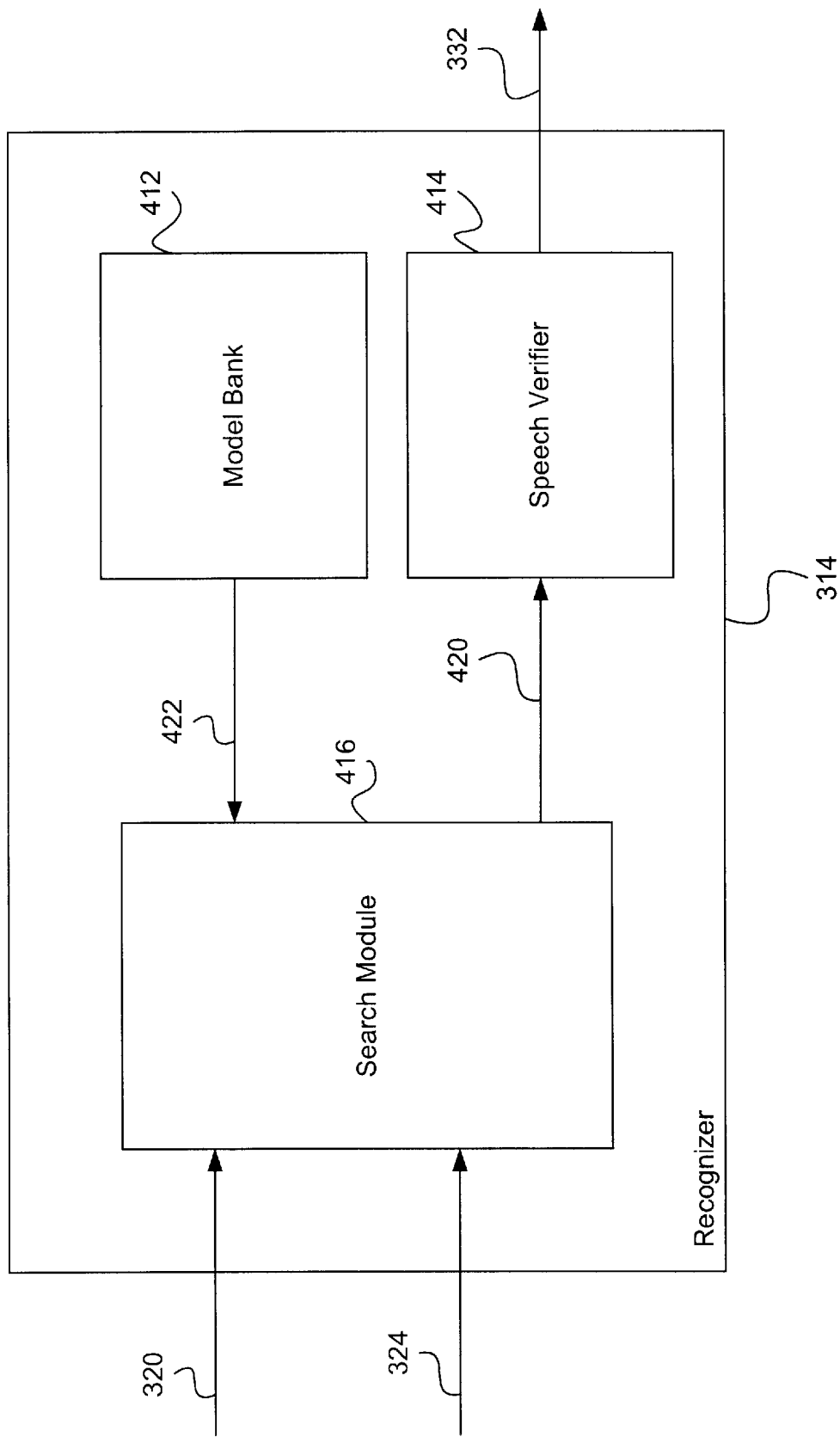
FIG. 4 is a block diagram for one embodiment of the recognizer of FIG. 3, according to the present invention.

Referring now to FIG. 4, a block diagram for one embodiment of the recognizer 314 of FIG. 3 is shown, according to the present invention. Recognizer 314 includes, but is not limited to, a search module 416, a model bank 412 and a speech verifier 414. Model bank 412 includes a word model for every word in the vocabulary of system 110. Each model may preferably be a Hidden Markov Model that has been trained to recognize a specific word in the vocabulary.

Search module 416 receives feature vectors from feature extractor 310 via path 320, and receives endpoint data from endpoint detector 312 via path 324. Search module 416 compares the feature vectors for an utterance (the signal between endpoints) with each word model in model bank 412. Search module 416 produces a recognition score for the utterance from each model. Search module 416 ranks the recognition scores for the utterance from highest to lowest, and stores the recognition scores in model score registers 212. The word model that corresponds to the highest recognition score is the first candidate, the word model that corresponds to the next-highest recognition score is the second candidate, the word model that corresponds to the third-highest recognition score is the third candidate, and in this way all word models in model bank 412 are ranked. Typically, the first candidate is considered to be the recognized word.

Search module 416 outputs the ranked recognition scores to speech verifier 414 via path 420. In one embodiment, speech verifier 414 calculates a differential score for the utterance by calculating the difference between the recognition score of the first candidate and the recognition score of the second candidate, and then stores the differential score in differential score registers 214. Speech verifier 414 next compares the differential score for the utterance to a threshold value stored in threshold registers 216. The value of the differential score is a measure of the confidence that the recognized word is a valid vocabulary word of system 110.

If the differential score for the utterance is greater than or equal to the threshold value, then the word identified as the first candidate, or recognized word, is considered valid, and recognizer 314 outputs the result on path 322. If the differential score is less than the threshold value, then the first candidate is considered an invalid vocabulary word, and recognizer 314 outputs no result.

The threshold values stored in threshold registers 216 typically depend on the vocabulary words of system 110. Different sets of threshold values may be used in speech verifier 414, each set of threshold values providing different advantages to system 110. Methods for determining the threshold values of the present invention are discussed below in conjunction with FIGS. 5–7.

Figure 5:
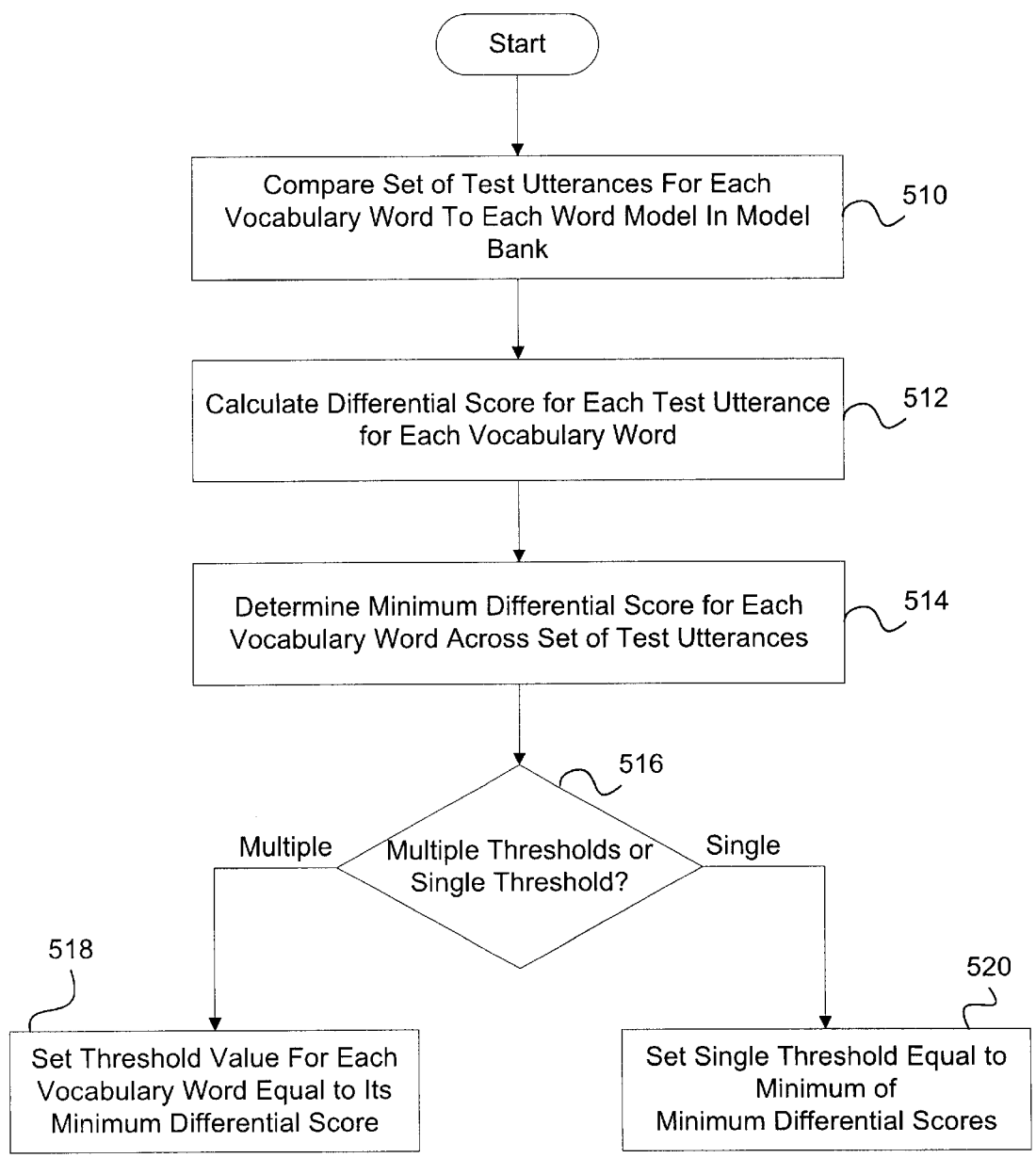
FIG. 5 is a flowchart of method steps for determining threshold values, according to one embodiment of the present invention.

Referring now to FIG. 5, a flowchart of method steps for determining threshold values is shown, according to one embodiment of the present invention. The threshold values are preferably determined during the design and manufacture of speech verifier 414, and are stored in threshold registers 216 during manufacture.

In step 510, search module 416 compares a set of test utterances for each vocabulary word to each model in model bank 412. Each vocabulary word has several associated test utterances. The set of test utterances may be represented as:

$$W_1 \rightarrow [U_{11}, U_{12}, U_{13}, \ldots U_{1L}]$$

$$W_2 \rightarrow [U_{21}, U_{22}, U_{23}, \ldots U_{2L}]$$

$$W_p \rightarrow [U_{p1}, U_{p2}, U_{p3}, \ldots U_{pL}]$$

where W is a vocabulary word, P is the number of words in the vocabulary, U is an utterance, and L is the number of test utterances for each vocabulary word. Model bank 412 produces a recognition score corresponding to each model for each utterance. Search module 416 then ranks the recognition scores for each utterance from highest to lowest.

Next, in step 512, speech verifier 414 determines a differential score for each utterance by calculating the difference between the recognition score of the first candidate and the recognition score for the second candidate. Thus, each utterance for each vocabulary word will have an associated differential score, which may be represented as:

$$W_1 \rightarrow [X_{11}, X_{12}, X_{13}, \ldots X_{1L}]$$

$$W_2 \rightarrow [X_{21}, X_{22}, X_{23}, \ldots X_{2L}]$$

$$W_p \rightarrow [X_{p1}, X_{p2}, X_{p3}, \ldots X_{pL}]$$

where W is a vocabulary word, P is the number of words in the vocabulary, X is a differential score, and L is the number of test utterances for each vocabulary word.

Then, in step 514, a system design program (not shown) determines a minimum differential score for each vocabulary word across the set of test utterances. Although a system design program is discussed, the functions performed by the design program may also be performed manually by a person skilled in the art. The minimum differential scores may be represented as:

$$W_1 \rightarrow [X_{1(min)}]$$

$$W_2 \rightarrow [X_{2(min)}]$$

$$W_p \rightarrow [X_{p(min)}]$$

In step 516, a system designer decides whether to utilize a single threshold or multiple thresholds in speech verifier 414. In one embodiment, speech verifier 414 uses multiple thresholds to determine the validity of recognized words. Speech verifier 414 uses a unique threshold to validate each word in the vocabulary. Speech verifier 414 selects a threshold for an utterance according to the word model that is the first candidate for the utterance. If the system designer chooses to implement the multiple threshold embodiment of speech verifier 414, then the method proceeds to step 518.

In step 518, the system design program sets the threshold value for each vocabulary word equal to its minimum differential score, which was determined in step 514. The threshold values may be represented as:

$$W_1[T_1] = [X_{1(min)}]$$

$$W_2[T_2] = [X_{2(min)}]$$

$$W_p[T_p] = [X_{p(min)}]$$

where T is the associated threshold for each vocabulary word. The system designer stores the multiple thresholds in threshold registers 216 during manufacture of system 110, and configures speech verifier 414 to compare each recognized word with its associated threshold as a confidence measure of the validity of the recognized word.

In a further embodiment, speech verifier 414 uses a single threshold to determine the validity of all recognized words. If the system designer chose to implement this embodiment of speech verifier 414 in step 516, then the method proceeds with step 520, where the system design program sets the single threshold equal to the minimum of the set of minimum differential scores for the vocabulary words. The system designer then configures speech verifier 414 to compare every recognized word differential score with the single threshold as a confidence measure of the validity of the recognized word.

Each vocabulary word has a different statistical duration, so that long words have lower differential scores than short words. If a single threshold is used for all words, the system designer may further configure speech verifier 414 to normalize the differential scores to duration before comparison with the single threshold. For example, speech verifier 414 may divide the differential score of the first candidate by the duration of the corresponding utterance, and then compare this quotient to the single threshold.

Figure 6:
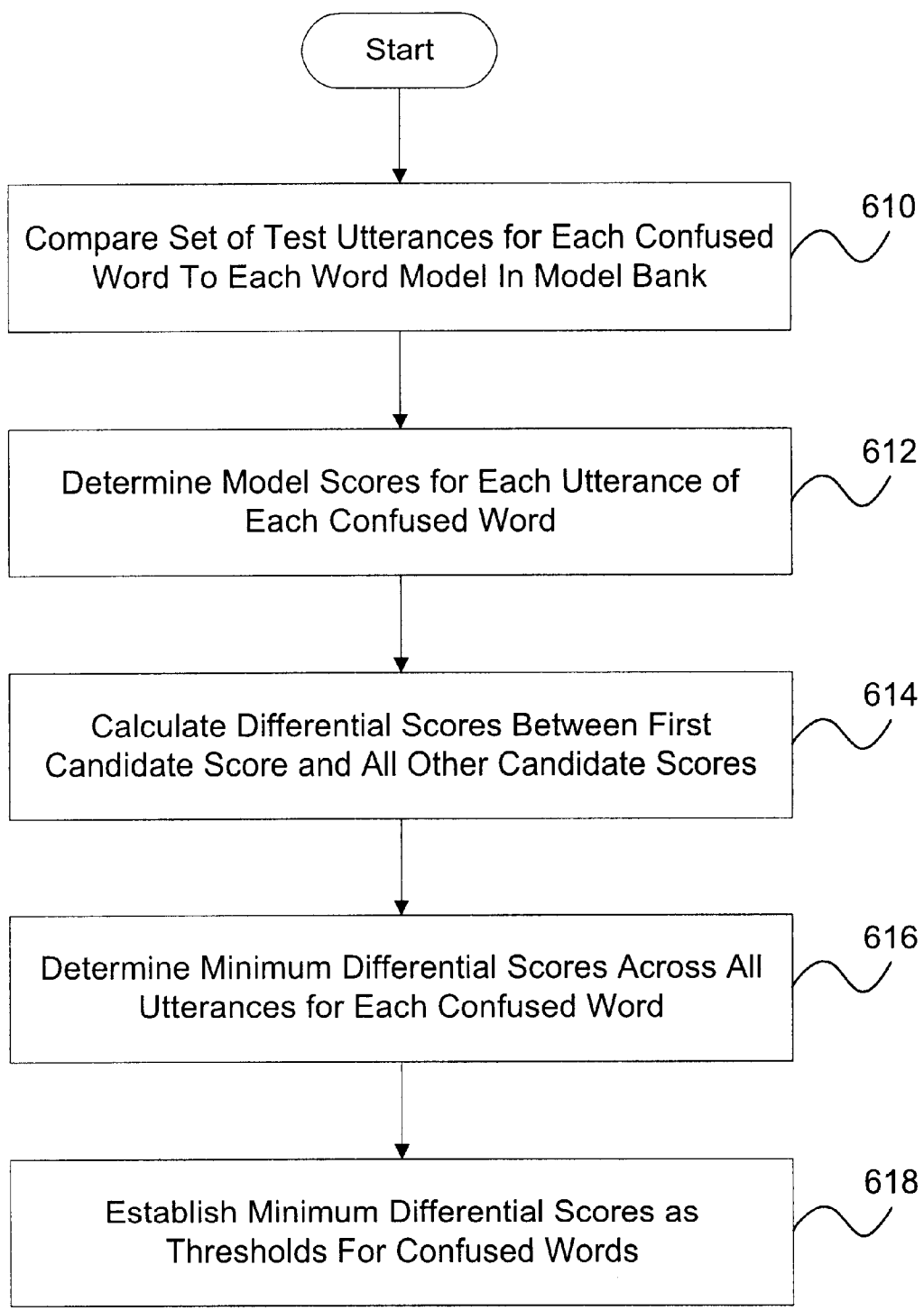
FIG. 6 is a flowchart of method steps for determining additional threshold values, according to one embodiment of the present invention.

Referring now to FIG. 6, a flowchart of method steps for determining additional threshold values for speech verifier 414 is shown, according to one embodiment of the present invention. The vocabulary of system 110 may contain one or more pairs of confused words. Confused words are phonetically similar and have a significant probability of being incorrectly recognized as the other word in the pair. To reduce this probability, a different threshold value is used when a confused word is ranked as a first candidate.

For example, a pair of confused words in the vocabulary of system 110 may be the compounds words "Santa Rosa" and "Santa Clara." Although written as two words, a compound word may be modeled in model bank 412 as one word. System 110 may confuse these two words because the first two syllables of the words are identical, and the final syllables of both words are similar. Recognizer 314 may incorrectly recognize "Santa Rosa" as "Santa Clara," and vice versa.

In step 610, search module 416 compares a set of test utterances for each confused word to each model in model bank 412. Each confused word has several associated test utterances. Test utterances for "Santa Rosa" and "Santa Clara" may be represented as:

$$SR \rightarrow [U_{SR1}, USR_2, \ldots U_{SRL}]$$

$$SC \rightarrow [U_{SC1}, USC_2, \ldots U_{SCL}]$$

where SR is Santa Rosa, SC is Santa Clara, U is a test utterance, and L is the number of test utterances for each confused word.

In step 612, search module 416 determines model scores for each test utterance of each confused word. Then, in step 614, speech verifier 414 calculates differential scores between the first candidate score and all other candidate scores. Thus, each utterance will have an associated group of differential scores. The group of differential scores for the first test utterance of "Santa Rosa" may be represented as:

$$U_{SR1} \rightarrow [X_{SR-SC}, X_{SR-Wn}, \ldots X_{SR-Wp}]$$

where $U_{SR1}$ is the first test utterance for "Santa Rosa," $X_{SR-SC}$ is the differential score between the word model score for "Santa Rosa" and the word model score for "Santa Clara," $X_{SR-Wn}$ is the differential score between the word model score for "Santa Rosa" and the word model score for a word Wn, and $X_{SR-WP}$ is the differential score between the word model score for "Santa Rosa" and the word model score for a word Wp, where p is the total number of words in the vocabulary of system 110.

Next, in step 616, the system design program determines minimum differential scores for each confused word. The system design program determines a minimum differential score between the word models for "Santa Rosa" and "Santa Clara," and determines a minimum differential score between the word model for "Santa Rosa" and all other word models. The system design program also determines a minimum differential score between the word models for "Santa Clara" and "Santa Rosa," and determines a minimum differential score between the word model for "Santa Clara" and all other word models in model bank 412. These differential scores may be represented as:

$$SR \rightarrow [X_{SR-SC(min)}, X_{SR-Wn(min)}, \ldots X_{SR-Wp(min)}]$$

$$SC \rightarrow [X_{SC-SR(min)}, X_{SC-Wn(min)}, \ldots X_{SC-Wp(min)}]$$

Finally, in step 618, the system design program establishes the minimum differential scores as thresholds for the confused words. The thresholds for the confused words may be represented as:

$$SR \rightarrow [T_{SR-SC}, T_{SR-Wn} \ldots T_{SR-Wp}]$$

$$SC \rightarrow [T_{SC-SR}, T_{SC-Wn} \ldots T_{SC-Wp}]$$

The system designer then stores the above thresholds in threshold register 216 in memory 130 during the manufacture of speech verifier 414 and system 110. In operation, if an utterance is input to search module 416, and responsively produces a confused word as the first candidate, then speech verifier 414 determines the identity of the second candidate and selects an appropriate threshold.

For example, if "Santa Rosa" is the first candidate for an utterance, speech verifier 414 determines the identity of the second candidate. If the second candidate is "Santa Clara," then speech verifier 414 selects $T_{SR-SC}$ as the threshold with which to compare the differential score for the utterance. If the second candidate is another word model, then speech verifier 414 selects the appropriate threshold for comparison with the differential score of the utterance. If the second candidate is word model Wn, then speech verifier 414 may select $T_{SR-Wn}$ as the threshold value. Speech verifier 414 may use a look-up table to select a threshold value that corresponds to the first and second candidates.

Figure 7:
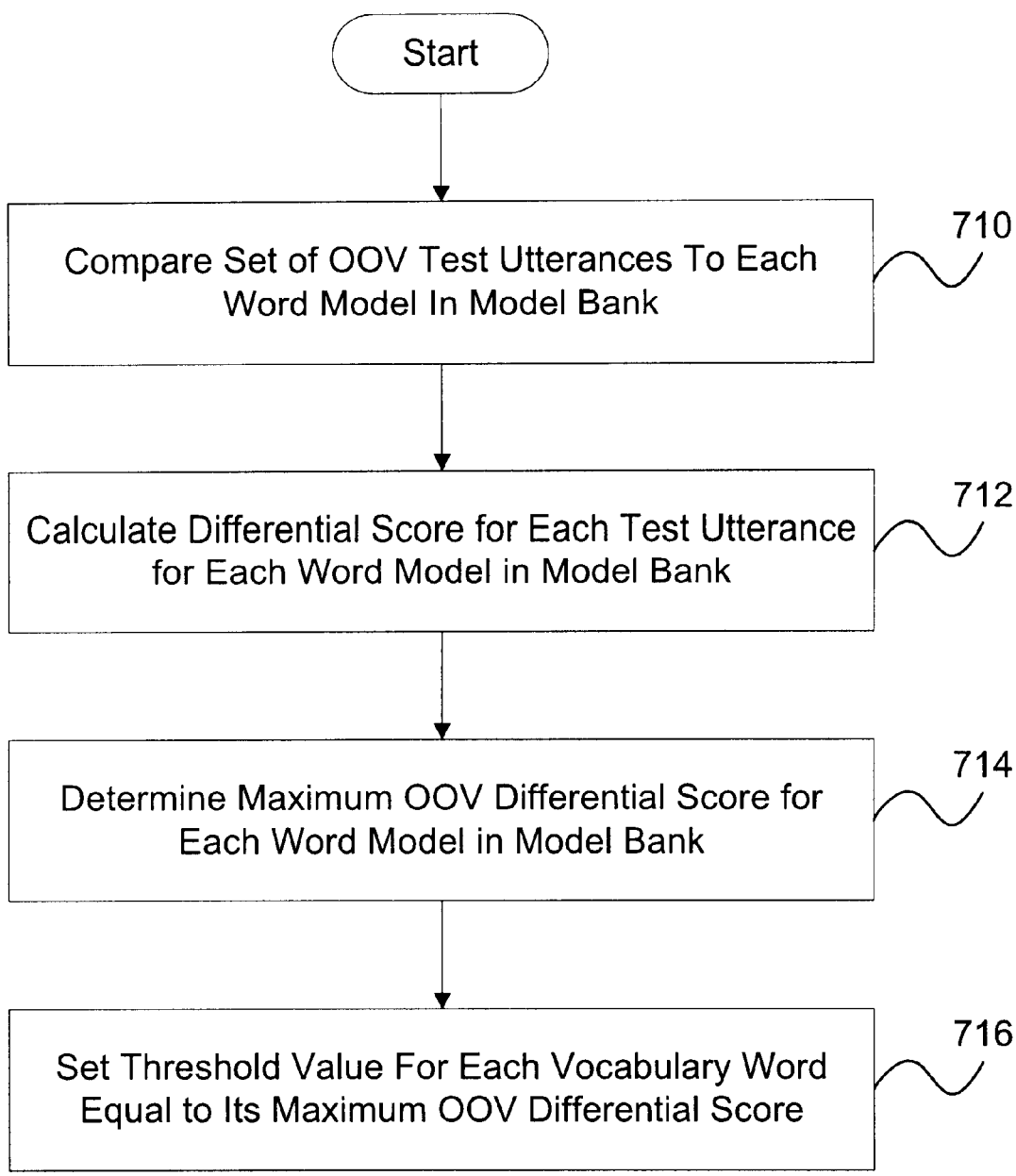
FIG. 7 is a flowchart of method steps for determining threshold values, according to another embodiment of the present invention.

Referring now to FIG. 7, a flowchart of method steps for determining threshold values for speech verifier 414 is shown, according to another embodiment of the present invention. In the FIG. 7 embodiment, threshold values are preferably determined by utilizing a maximum out-of-vocabulary differential score for each word model.

In step 710, search module 416 compares a set of out-of-vocabulary (OOV) test utterances to each word model in model bank 412. The OOV test utterances may be any test utterances that do not correspond to words in the vocabulary of system 110. In the preferred embodiment, the OOV test utterances include OOV utterances that may be received by system 110 in its intended operating environment.

Search module 416 preferably produces a recognition score for each OOV test utterance for each word model. Then, in step 712, speech verifier 414 calculates a differential score for each OOV test utterance for each word model. In step 714, the system design program determines a maximum OOV differential score for each word model in model bank 412. In step 716, the system design program sets a threshold value for each vocabulary word equal to its maximum OOV differential score, which may be represented as:

$$W_1 \rightarrow [T_1][=X_{1(max)}]$$

$$W_2 \rightarrow [T_2][=X_{2(max)}]$$

$$W_p \rightarrow [T_p][=X_{p(max)}]$$

When speech verifier 414 utilizes the maximum OOV differential scores as the threshold values, the rejection accuracy of recognizer 310 is maximized, and may be as high as one hundred percent. Rejection accuracy may be defined as:

$$RA = 1 - \frac{ER}{TR}$$

where RA is the rejection accuracy, ER is the number of incorrectly recognized utterances, and TR is the total number of utterances that should be rejected by recognizer 310.

On the other hand, when speech verifier 414 utilizes the minimum differential scores as the threshold values, as described above in conjunction with FIG. 5, recognition accuracy is maximized. Recognition accuracy may be defined as:

$$A = \frac{CV}{TV}$$

where A is the recognition accuracy, CV is the number of correctly recognized in-vocabulary utterances, and TV is the total number of in-vocabulary utterances input to recognizer 310.

For good recognition accuracy, a small threshold value is desirable; however, a small threshold value will produce a lower than desirable rejection accuracy. Threshold values for each word model between the minimum differential score and the maximum OOV differential score may be chosen to provide a trade-off between maximizing rejection accuracy and maximizing recognition accuracy. An intermediate threshold value for a word model may be determined by:

$$T = T_{min} + \alpha(T_{max} - T_{min})$$

where T is the intermediate threshold value, $T_{min}$ is the minimum threshold value, $T_{max}$ is the maximum threshold value, and $\alpha$ is a constant. The value of $\alpha$ may be varied between 0 and 1 to control the value of T.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for performing a speech verification of an utterance, comprising:
    a speech verifier configured to verify that said utterance is valid for a vocabulary of said system by using a differential score for said utterance; and
    a processor configured to control said speech verifier to thereby perform said speech verification.

2. The system of claim 1, wherein said speech verifier utilizes a threshold value to verify that said utterance is valid for said vocabulary.

3. The system of claim 2, wherein said speech verifier compares said differential score for said utterance with said threshold value to verify that said utterance is valid for said vocabulary.

4. The system of claim 3, wherein said utterance is a valid vocabulary word if said differential score for said utterance is greater than or equal to said threshold value.

5. A system for performing a speech verification of an utterance, comprising:
    a speech verifier configured to verify that said utterance is valid for a vocabulary of said system by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said differential score being a difference between a highest recognition score for said utterance and a next highest recognition score for said utterance; and
    a processor configured to control said speech verifier to thereby perform said speech verification.

6. A system for performing a speech verification of an utterance, comprising:
    a speech verifier configured to verify that said utterance is valid for a vocabulary of said system by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value being a minimum differential score over all words in said vocabulary; and
    a processor configured to control said speech verifier to thereby perform said speech verification.

7. The system of claim 6, wherein said differential score of said utterance is normalized to duration before comparison with said threshold value.

8. A system for performing a speech verification of an utterance, comprising:
    a speech verifier configured to verify that said utterance is valid for a vocabulary of said system by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value corresponding to a vocabulary word that returns a highest recognition score; and
    a processor configured to control said speech verifier to thereby perform said speech verification.

9. The system of claim 8, wherein each word in said vocabulary has an associated threshold value.

10. The system of claim 8, wherein said threshold value is a minimum differential score over a set of test utterances for said vocabulary word.

11. A system for performing a speech verification of an utterance, comprising:
    a speech verifier configured to verify that said utterance is valid for a vocabulary of said system by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value depending upon a first vocabulary word that returns a highest recognition score and a second vocabulary word that returns a next highest recognition score; and
    a processor configured to control said speech verifier to thereby perform said speech verification.

12. The system of claim 11, wherein said first vocabulary word and said second vocabulary word are a pair of confused words, said pair of confused words being phonetically similar such that one of said pair of confused words may be incorrectly recognized as the other one of said pair of confused words.

13. A system for performing a speech verification of an utterance, comprising:
    a speech verifier configured to verify that said utterance is valid for a vocabulary of said system by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value being an intermediate threshold value between a minimum threshold value and a maximum threshold value; and a processor configured to control said speech verifier to thereby perform said speech verification.

14. The system of claim 13, wherein said intermediate threshold value is determined using a formula:

$$T=T_{min}+\alpha(T_{max}-T_{min})$$

where T is said intermediate threshold value, $T_{min}$ is said minimum threshold value, $T_{max}$ is said maximum threshold value, and $\alpha$ is a constant that varies between 0 and 1.

15. The system of claim 13, wherein said maximum threshold value is a maximum differential score for an out-of-vocabulary test utterance.

16. A method for performing a speech verification of an utterance, comprising the steps of:

verifying that said utterance is valid for a vocabulary using a speech verifier and by using a differential score for said utterance; and controlling said speech verifier with a processor to thereby perform said speech verification.

17. The method of claim 16, wherein said speech verifier utilizes a threshold value to verify that said utterance is valid for said vocabulary.

18. The method of claim 17, wherein said speech verifier compares said differential score for said utterance with said threshold value to verify that said utterance is valid for said vocabulary.

19. The method of claim 18, wherein said utterance is valid for said vocabulary if said differential score for said utterance is greater than or equal to said threshold value.

20. A method for performing a speech verification of an utterance, comprising the steps of:

verifying that said utterance is valid for a vocabulary using a speech verifier and by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said differential score being a difference between a highest recognition score for said utterance and a next highest recognition score for said utterance; and controlling said speech verifier with a processor to thereby perform said speech verification.

21. A method for performing a speech verification of an utterance, comprising the steps of:

verifying that said utterance is valid for a vocabulary using a speech verifier and by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value being a minimum differential score over all words in said vocabulary; and controlling said speech verifier with a processor to thereby perform said speech verification.

22. The method of claim 21, wherein said differential score of said utterance is normalized to duration before comparison with said threshold value.

23. The method of claim 21, wherein said threshold value is compared to said differential score of said utterance independent of a vocabulary word that returns a highest recognition score.

24. A method for performing a speech verification of an utterance, comprising the steps of:

verifying that said utterance is valid for a vocabulary using a speech verifier and by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value corresponding to a vocabulary word that returns a highest recognition score; and controlling said speech verifier with a processor to thereby perform said speech verification.

25. The method of claim 24, wherein each word in said vocabulary has an associated threshold value.

26. The method of claim 24 wherein said threshold value is a minimum differential score over a set of test utterances for said vocabulary word.

27. A method for performing a speech verification of an utterance, comprising the steps of:

verifying that said utterance is valid for a vocabulary using a speech verifier and by using a differential score for said utterance, said speech verifier utilizing a threshold value to verify that said utterance is valid for said vocabulary, said speech verifier comparing said differential score for said utterance with said threshold value to verify that said utterance is valid for said vocabulary, said threshold value depending upon a first vocabulary word that returns a highest recognition score and a second vocabulary word that returns a next highest recognition score; and controlling said speech verifier with a processor to thereby perform said speech verification.

28. The method of claim 27 wherein said first vocabulary word and said second vocabulary word are a pair of confused words, said pair of confused words being phonetically similar such that one word in said pair of confused words may be incorrectly recognized as the other word in said pair of confused words.

29. A method for performing a speech verification of an utterance, comprising the steps of:

verifying that said utterance is valid for a vocabulary using a speech verifier and by using a differential score for said utterance, said speech verifier utilizing a threshold value to verify that said utterance is valid for said-vocabulary, said speech verifier comparing said differential score for said utterance with said threshold value to verify that said utterance is valid for said vocabulary, said threshold value being an intermediate threshold value between a minimum threshold value and a maximum threshold value; and controlling said speech verifier with a processor to thereby perform said speech verification.

30. The method of claim 29, wherein said intermediate threshold value is determined using a formula:

$$T=T_{min}+\alpha(T_{max}-T_{min})$$

where T is said intermediate threshold value, $T_{min}$ is said minimum threshold value, $T_{max}$ is said maximum threshold value, and $\alpha$ is a constant that varies between 0 and 1.

31. The method of claim 29, wherein said maximum threshold value is a maximum differential score for an out-of-vocabulary test utterance.

32. A system for performing speech verification of an utterance, comprising:
    means for verifying that said utterance is valid for a vocabulary using a speech verifier and by using a differential score for said utterance; and
    means for controlling said speech verifier to perform said speech verification.

33. A method for determining threshold values for speech verification of an utterance, comprising the steps of:
    creating a model for each word in a vocabulary;
    comparing a set of test utterances with each model;
    determining a differential score for each test utterance for each model;
    determining a minimum differential score for each model across said set of test utterances; and
    determining a threshold value for each model utilizing said minimum differential score.

34. A computer-readable medium comprising program instructions for performing speech verification of an utterance, by performing the steps of:
    verifying that said utterance is valid for a vocabulary using a speech verifier and by using a differential score for said utterance; and
    controlling said speech verifier with a processor to thereby perform said speech verification.

35. The method of claim 34, further comprising the step of determining a single threshold value by utilizing a minimum of said minimum differential scores across all models.

36. The method of claim 34, further comprising the steps of:
    comparing a set of out-of-vocabulary test utterances with each model;
    determining a differential score for each out-of-vocabulary test utterance for each model;
    determining a maximum differential score for each model across said set of out-of-vocabulary test utterances; and
    determining an intermediate threshold value for each model utilizing said minimum differential score and said maximum differential score.

37. The method of claim 34, wherein said threshold value for each model is compared to a differential score for an utterance to verify that said utterance is a word in a vocabulary of a speech recognition system.

* * * * *